United States Patent [19]

Bergen et al.

[11] Patent Number: 4,536,621

[45] Date of Patent: Aug. 20, 1985

[54] DUAL TALK PATH KEY TELEPHONE

[75] Inventors: Henry M. Bergen, Floral Park; Sedat Zaimi, New York; Vincenzo Castellano, Brooklyn; Irwin Schildkraut, New York, all of N.Y.

[73] Assignee: IPC Communications, Ltd., Greenwich, Conn.

[21] Appl. No.: 608,239

[22] Filed: May 8, 1984

[51] Int. Cl.³ .................... H04M 1/02; H04M 1/72
[52] U.S. Cl. ................... 179/99 R; 179/99 A; 179/99 LS; 179/100 R; 179/101
[58] Field of Search ............... 179/99 R, 99 A, 99 E, 179/99 LC, 99 H, 99 LS, 99 P, 99 M, 100 R, 100 C, 100 D, 100 L, 101, 102, 103, 160, 182 A, 187, 40 K, 84 R, 81 R

[56] References Cited

U.S. PATENT DOCUMENTS

Re. 31,144  2/1983  Feil ............................ 179/99 LS
3,665,112  5/1972  Blake et al. ................. 179/99 R
4,107,477  8/1978  Morrison .................... 179/99 R
4,329,543  5/1982  Danford ..................... 179/1 HF Primary Examiner—Gene Z. Rubinson
Assistant Examiner—Elio Di Vito
Attorney, Agent, or Firm—Morgan, Finnegan, Pine, Foley & Lee

[57] ABSTRACT

In a multiple talk path key telephone of the type of having multiple handsets, each handset is coupled to the key field for a predetermined short period of time when it is initially taken "off hook". During this predetermined time period a user can depress a key and connect with a desired telephone line. If the user has the handset "off hook" and desires to connect to another telephone line, he merely depresses an access key and the handset is again reconnected to the key field for the predetermined time period. The present invention eliminates the possibility of one user disconnecting another user's telephone line during a telephone conversation.

3 Claims, 4 Drawing Figures

DUAL TALK PATH KEY TELEPHONE

This invention relates to multi-line key telephone systems and more particularly, to such systems wherein the telephones include multiple talk paths.

BACKGROUND OF THE INVENTION

Multi-line key telephones, also referred to as "trader turrets", are commonly used in rapid communication networks such as trading operations in banks, brokerage houses and other financial institutions. Timing is often paramount in effective trading of securities and commodities and therefore brokers must have almost instant access to traders. This is accomplished by key telephone networks wherein each broker has a key telephone with a separate line key for each trader he is likely to contact. By actuating a single line key the broker is in direct line contact with the trader. Key telephones typically have between 24 and 120 line keys. A key telephone system is described in U.S. Pat. No. Re. 31,144 "MULTI-STATION TELEPHONE SWITCHING SYSTEM" issued to Interconnect Planning Corporation of New York.

Since the key telephones can be quite large and expensive due to the large number of line keys, it is sometimes desirable to construct a key telephone with multiple talk paths, i.e., with two or more separate handsets. With a dual talk path arrangement, the key telephone is placed between two users who share a common key field to select connections for their individual handsets.

In the past such multiple telephones have existed in dual talk path (DTP) configuration with a toggle controlled "split field" switch arrangement wherein one handset or the other is coupled to the key field depending upon the position of the toggle switch. In a DTP system the user must first check the toggle position of the split field switch and, if in the wrong position, must actuate the switch to transfer control to his handset. Thereafter actuation of a line key connects the users handset to the line corresponding to the actuated line key.

Auxiliary talk paths (ATP) arrangements have also existed wherein one hand set is designated the primary talk path and the other handset is designated the auxiliary talk path. In ATP arrangements the primary handset is normally coupled to the key field. If the user of the auxiliary talk path wants a line connection he must first actuate an access key to momentarily transfer control to his handset and then actuate a selected line key.

The problem with both of these prior systems is the high likelihood of an accidental disconnect. In trading operations, often involving millions of dollars, an accidental line disconnect can have serious consequences. The problem arises when one of the users hits a line key when the key field is connected to the other user's handset. Instead of connecting his handset to a new line, he actually disconnects the other handset and connects the other handset to a new line. In the DTP arrangement this occurs when a user fails to properly set the split field toggle switch prior to hitting a line key. In the ATP arrangement the accidental disconnect occurs when the user of the auxiliary handset fails to hit the access key prior to actuating a line key.

An object to this invention is to provide a multiple talk path system which safeguards against accidental disconnects.

SUMMARY OF THE INVENTION

In the system according to the invention the key telephone with multiple talk paths is arranged so that neither handset is normally coupled to the key field. When a handset is initially taken "off-hook", that handset is coupled to the key field for a predetermined short period of time, e.g. six seconds. During this period the user can hit a line key and connect the handset to the corresponding line. If the handset is "off hook" and the user wants to transfer to a new line, he must first hit an access key which couples the handset to the key field for a predetermined short period during which the line key can be connected for a new line connection.

Since neither handset is normally connected to the key field the danger of an improper line key actuation causing an accidental disconnect is eliminated. The short periods during which the key field is connected to a handset occur only for brief periods during which a new line connection is desired. Should an incorrect line key actuation take place during this brief interval it would result in an incorrect line connection but would not result in a disconnect. Thus, the problem of accidental disconnects in multiple talk path telephones is eliminated.

In an alternative embodiment the same system can be designed to alternatively provide split key field operation whereby the users may elect to divide the keys so that only certain keys are coupled to one handset and the remaining keys are connected to the other handset. Normally, such split key field arrangements would have no advantage over two separate key telephones. However, with the system according to the invention wherein the same network could include both types of key telephones, there is the advantage where some key telephones can operate in the split key mode where fewer direct access lines are required.

DETAILED DESCRIPTION

Figure 1:
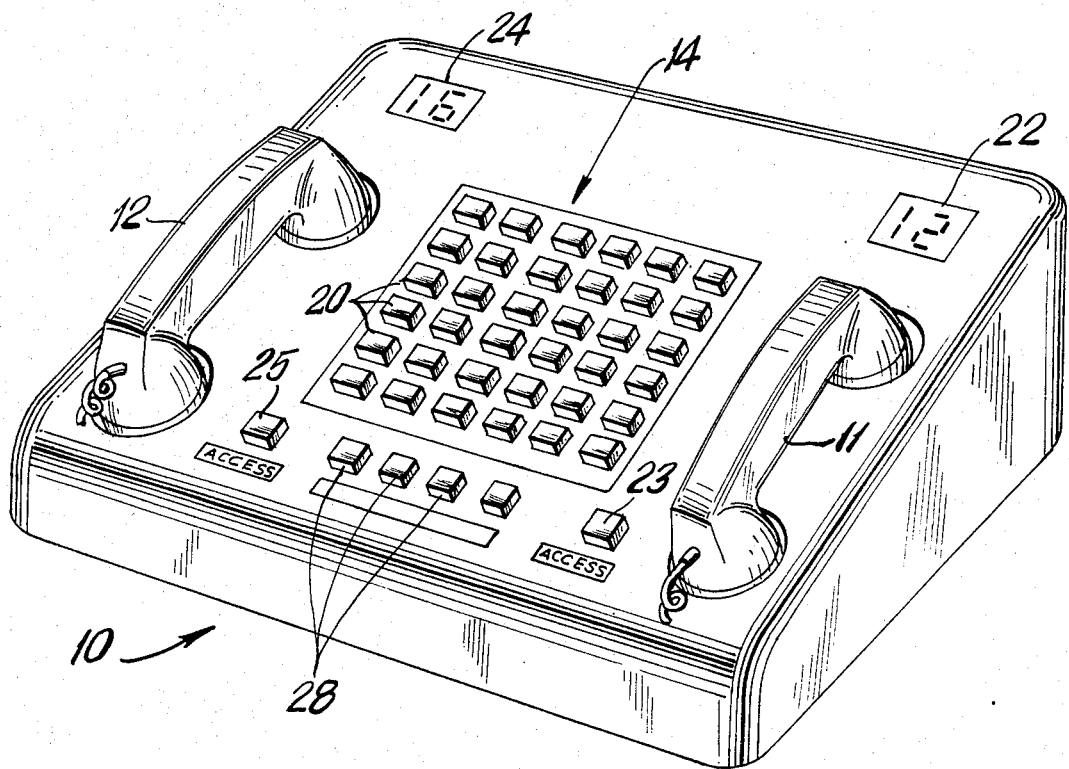
FIG. 1 is a perspective view of a key line telephone according to the invention.

The key telephone according to the invention can be constructed as shown in FIG. 1 including two handsets 11 and 12 together with a common key field 14. The key field includes individual non-locking push button keys 20 corresponding to the individual lines to which the handsets may be connected. The keys are partially transparent and include a lamp (light emitting diode) which can light up to indicate line status. A numerical digital indicator 22 is associated with handset 11 and displays a numerical indication of the line to which the handset is connected. An "access" key 23 is also associated with handset 11 to give the user access to a new line while the handset is off hook. Digital display 24 and access key 25 are similarly associated with handset 12. In addition, the telephone may include other function keys 28 to control other features such as hold, conference, ring forward, etc. which are well known in the art. A conventional dial key pad (not shown) may also be included on the telephone if desired.

In operation, if the user on the right picks up handset 11, key field 14 controls line selection for this handset for a predetermined period of time such as six seconds. If the user selects a key associated with line "12", for example, the handset is connected to line "12" by the central switch control and the number "12" appears on digital display 22 as shown. When the line connection is made, the lamp in the key associated with line "12" lights up on all telephones in the system where that line appears indicating that line is in use.

While the handset is off hook, if the user wants a different line, access key 23 is momentarily depressed so that the key field 14 is again available for connection of handset 11 for a predetermined period. During this interval, if one of the keys 20 are depressed, the corresponding line is connected to handset 11.

Operation with respect to handset 12 is similar in relationship to digital indicator 24 and access key 25.

With the arrangement according to the invention, an accidental disconnect is virtually impossible. The only way such a disconnect could occur is if one user hits the key field during the short interval when the key field is connected to control the other user's handset. However, this would be at a time when a new line is being selected and would not occur during an ongoing conversation. Hence, the effect would be an incorrect new connection rather than an accidental disconnect of an ongoing conversation.

Figure 2:
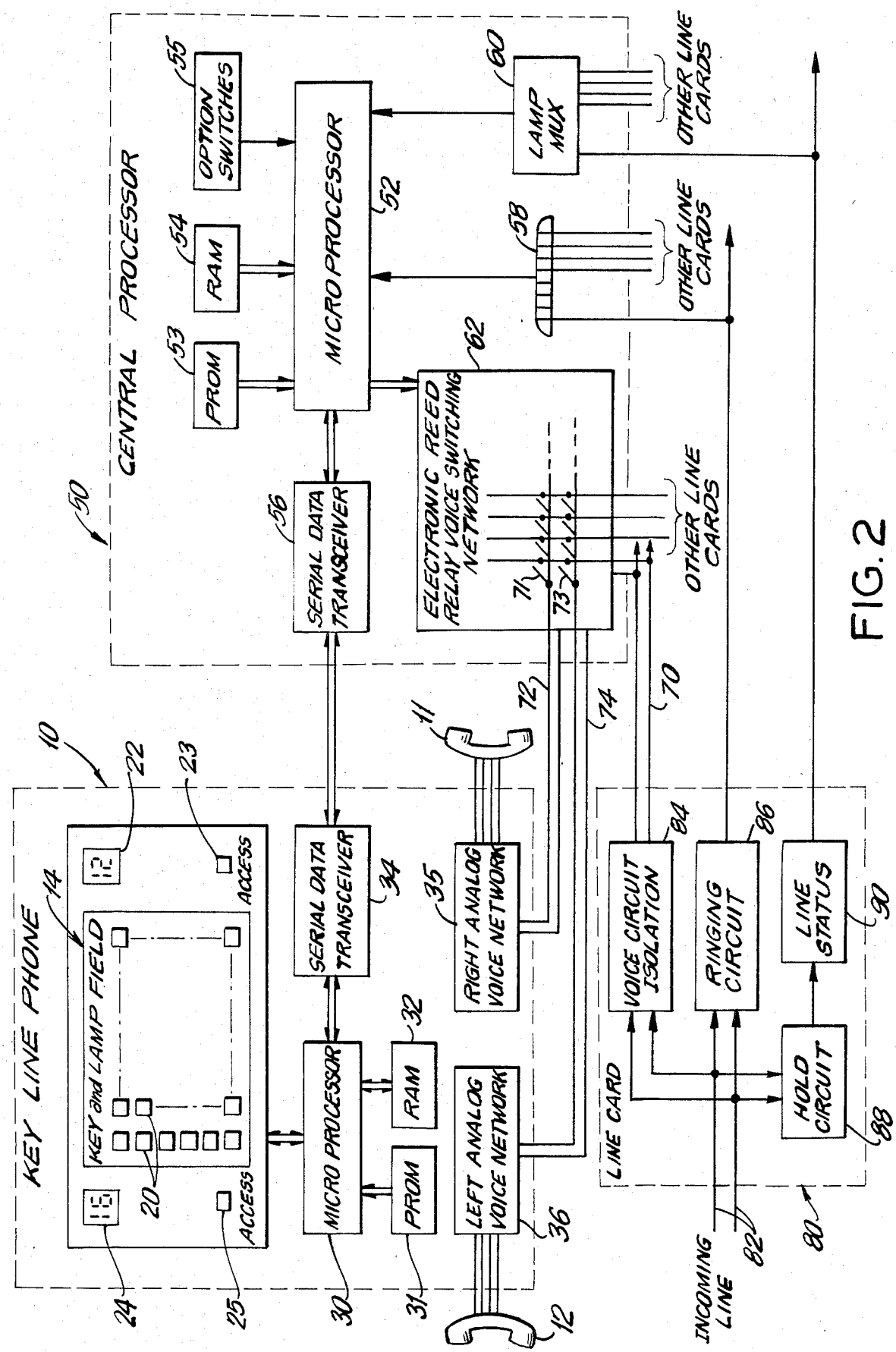
FIG. 2 is a block diagram of the hardware portion of the system according to the invention.

FIG. 2 is a block diagram showing the basic hardware implementation for the invention including telephone 10, a corresponding central processor card 50 and a line card 80. In an actual system there would, of course, be many telephones and many line cards coupled to the corresponding central processor cards. Also, the system would most likely include many conventional telephone features commonly used in the art which have been omitted in FIG. 2 for simplicity.

Phone unit 10 includes a digital microprocessor 30 together with a PROM (programmable read only memory) 31 and a RAM (random access memory) 32. The PROM has the telephone operating software (see FIG. 3) stored therein as well as information which defines the available telephone configurations, i.e., dual talkpath, split field etc. The RAM on the other hand, stores dynamic data which is used to control operation when the telephone is in use. For example, the RAM memory stores information indicating the current line status for each line in the system and stores information indicating the line to which a particular handset is connected. When the telephone is initially energized or powered up, the microprocessor looks to a particular memory location in PROM 31 to initiate the start-up sequence which initializes the system and selects the telephone configuration. Thereafter the dynamic control is achieved according to the data in RAM 32.

Various ports of the microprocessor 30 are connected to read the status of the keys in key field 14 and to control energization of the lamps (LED's) in the key field. The microprocessor is similarly coupled to keys 23 and 25 and digital indicators 22 and 24. Furthermore, indications are also received indicating where the handsets are "on hook" or "off-hook."

Ports of microprocessor 30 are also coupled to a serial data transceiver 34 which is used to couple microprocessor 30 to the corresponding central processor card 50 to be described hereinafter.

Handsets 11 and 12 as shown in FIG. 2 are of the analog type and are coupled to the system via their respective analog voice networks 35 and 36, respectively. Although analog voice networks are shown in FIG. 2, it would be possible to utilize digital voice networks to provide the audio signals for the handsets and such digital voice signals could be processed through the microprocessor and thereafter converted to analog signals using a digital to analog converter.

Central processor card 50 includes a separate microprocessor 52 with an associated PROM 53 and associated RAM 54. In trader turrets where system reliability is at a premium it is important to use distributed logic by using separate microprocessors for the individual telephone consoles. Distributed logic avoids sole dependence on a central processor for system operation. Prom 53, has the central processing software (see FIG. 4) stored therein as well as data defining the available telephone configurations. Ram 54, on the other hand, is utilized to maintain current operating data for the system indicating, for example line status and line connections to various telephone extensions.

The central processor card includes a serial data transceiver 56 connected to one of the ports of microprocessor 52. Transceiver 56 is coupled via a cable connection to the serial data transceiver 34 in the telephone connected to the particular central processor card. When microprocessor 52 transfers data to the telephone, synchronizing signals are sent to that telephone via transceivers 56 and 34 which thereafter transfer data from microprocessor 52 into microprocessor 30. Likewise, data is transferred from a telephone to the central processor in a similar fashion via transceivers 34 and 56. Option switches 55 are set to select the specific options to be used at the phone.

Microprocessor 52 also controls an electronic reed relay voice switching network 62 which completes the physical connections from individual lines to the selected telephones. The microprocessor also receives ringing signals via an OR gate 58 and line status indications via a lamp multiplex unit (lamp MUX) 60.

Each incoming line is terminated in a conventional line card such as line card 80. The line card includes a voice isolation circuit 84, a ringing circuit 86 and a hold circuit 88, each connected to the incoming lines 82. The voice isolation circuit includes an isolation transformer used to prevent ringing signals from appearing on the voice lines. The ringing signals (typically 105 Volts at 20 Hertz) are detected by ringing circuit 86 and converted to a digital signal which is low for two seconds and high for four seconds. Hold circuit 88 operates in conventional fashion and supplies a dummy load termination when a line is placed on "hold". A line status circuit 90 detects the line status and produces corresponding digital output signals. An "in use" connection is a steady on whereas a hold connection is a sequence half a second low, half a second high.

The incoming line is connectable to a particular telephone voice network via switching network 62. The audio signal from isolation circuit 84 can be connected to voice network 34 of handset 11 via lines 70 and 72 by actuating a relay coil to close contacts 71 in the switching network. Similarly, the same line can be connected to handset 12 and voice network 36 via conductors 70 and 74 by actuating the relay coil which closes contacts 73. For simplicity of illustration, only a single line connection has been described for the audio voice paths.

RAM 54 includes a section of memory set aside to form a memory array for storing the conditions for the individual relays in switching network 62. A digital "0"

in the memory would indicate the corresponding relay is in the deenergized state whereas a digital "1" if the same memory location would indicate an energized state for the relay. The memory states are set by the operating software of the microprocessor. Periodically the memory states are transferred to the relays by scanning the memory array and passing an energizing pulse to the corresponding reed relay when a "1" state is detected. The relays are thus maintained in the energized state by periodically forwarding a refresh pulse depending upon the state of the corresponding memory location in RAM 54. As an alternative to the refresh technique, latching circuits could be emloyed to hold the relays in the desired state.

Figure 3:
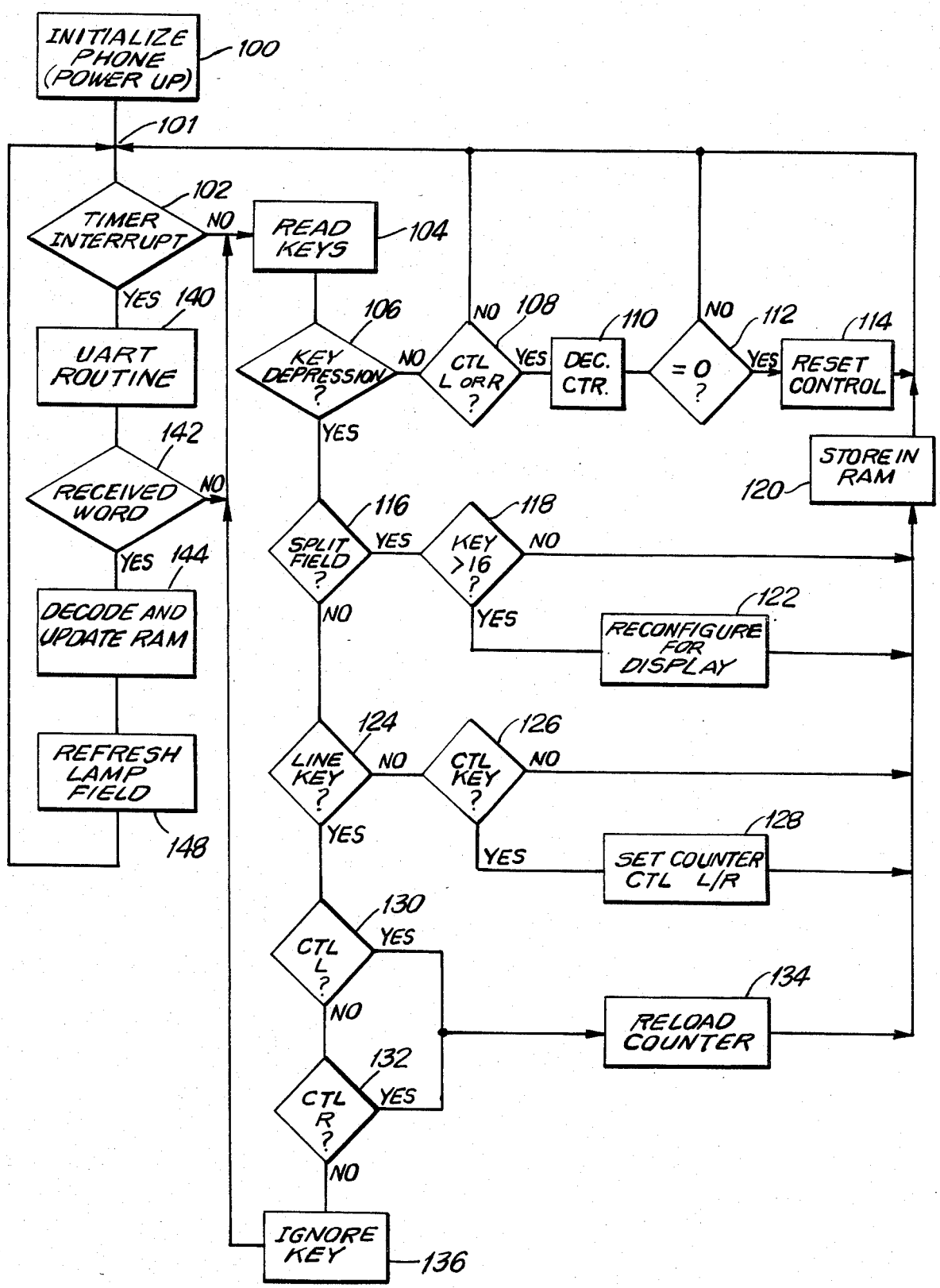
FIG. 3 is a flow diagram of the software in the key telephone.

Software for microprocessor 30 in the telephone is according to the flow diagram in FIG. 3. Once the system has been initialized when power is turned on the system operates in either of two loops. One loop basically reads the keys on the telephone and updates memory accordingly. The other loop is initiated by activating an interrupt. In the second loop data is transmitted from the telephone to the central processor and then received from the central processor to update RAM 32 and to refresh the lamp field.

More specifically, step 100 is the initialization program wherein the microprocessor waits until information is received and stored in RAM 32 indicating the selected options from option switches 55.

After the system has been initialized, if there is no interrupt as determined by decision 102, the processor proceeds to interrogate the keys in step 104.

If the system is operated in a dual talkpath, single key field mode, operation is controlled by a six second counter and associated left and right control states. If access key 23 (FIG. 1) is actuated for the right handset, the right control is "set" and the counter is decremented over a six second interval. During the six second interval, any key depression is transferred to memory corresponding to line connections for the right handset. At the end of the six second interval, the right control state is "reset". If, on the other hand, access Key 25 is actuated for the left handset, operation is similar except that the left control is set rather than the right.

More specifically, after the key field has been read in step 104, the program determines whether or not there has been a key depression in step 106. If not, the program then determines if either the right or left controls are in the "set" state in decision 108. If not, the loop is complete and returns to point 101. If one of the controls is in the set state, the six second counter is decremented in step 110. If the count is not zero, as determined in decision 112, the loop is complete and returns to point 101 whereas, if the count is zero indicating completion of the six second interval, the active control is "reset" in step 114.

If decision 106 determines that there has been a key depression, the program next determines whether or not the console is operating on a split field mode in decision 116. If not, the program next proceeds to determine the type of key depression in decisions 124 and 126. If the key depression is not a line key, as determined in decision 124, the program determines whether or not the key depression is one of the access keys in decision 126. If not, the key depression is transferred to RAM memory in step 120. On the other hand, if decision 126 determines that a control key has been depressed, the counter is "set" to commence a six second count interval and the appropriate one of the left or right controls is placed in the "set" state in step 128.

If decision 124 determines that a line key has been depressed, the program next determines in decisions 130 and 132 whether or not one of the controls is in the "set" state. If so, the counter is reset in step 134 and the line indication is transferred to memory for the appropriate handset in step 120. If neither of the controls are in the "set" state, indicating an accidental or incorrect key depression, the key depression reading is cancelled in step 136 so that this key depression is ignored.

If decision 116 determines that the console is set for a split field operation, the program goes to decision 118. If there are 32 keys in the key field and 16 are assigned to each handset, the program must determine whether the actuated key is above or below 16. If below 16 then the key depression is transferred to RAM storage in step 120 indicating a line connection for the appropriate handset display line. If, on the other hand, the actuated key is between 17 and 32, the key indication is reconfigured for display purposes in step 122 by subtracting 16 and placing the line indication in memory for controlling the correct handset display.

The other principal loop for the program includes steps 140-148. This loop is initiated in response to an interrupt received from the central processor indicating that information is being sent to the telephone. Step 140 is a UART (universal asynchronous receiver transmitter) routine which controls transceiver 34 in the telephone to receive data from the central processor and to transmit data to the central processor. If decision 142 determines that no information has been received from the central processor then the program returns to the basic loop including steps 104–135. On the other hand, if decision 142 determines that information has been received, then the program progresses to step 144 in which the received data is decoded and the RAM updated accordingly. In step 148 the program proceeds to read the memory section associated with the lamp field states and pulses each individual lamp if the corresponding memory state is a "1". The program passes through lamp refresh step 148 many times per second and, thus, the lamps appear to be lit continuously even though they are pulsed periodically. Once step 148 is completed the loop returns to point 101 and then to the basic loop if there is no interrupt.

Figure 4:
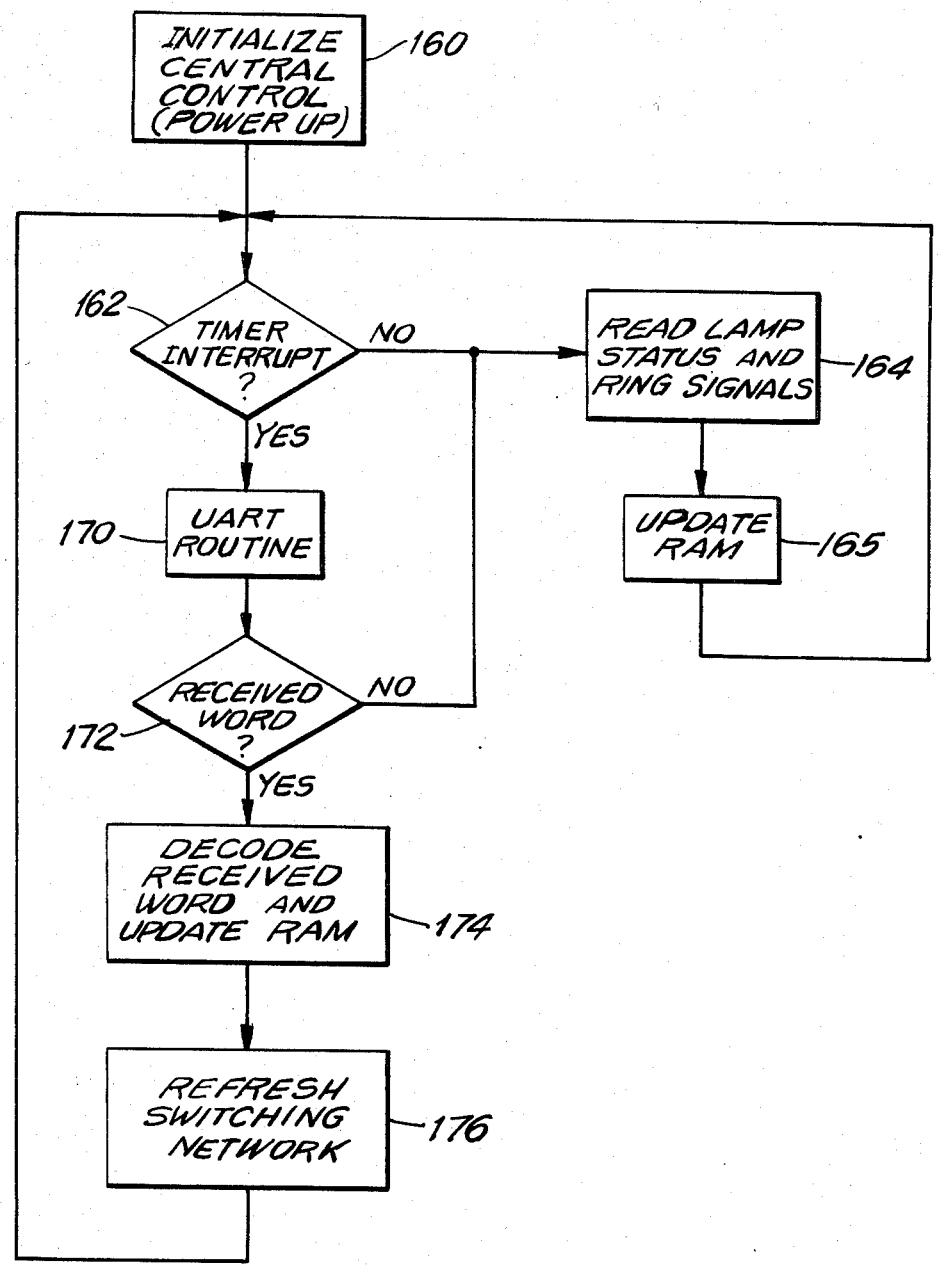
FIG. 4 is a flow diagram of the central processor software.

The program for controlling the central processor similarly includes two loops, a basic loop and an interrupt loop, as shown in FIG. 4. When processor 52 is initially turned on or powered up in the step 160, the micro processor interrogates option switches 55 and loads data into the RAM indicating the selected options.

After initialization, if an interrupt is not present as determined in decision 162, the program proceeds to step 164 which is to read all of the input ports giving the line status for each incoming line and any ringing signals that may be present. The status of the ports is transferred to RAM memory to update the memory accordingly. This loop repeats, thereby continually updating the RAM until such time as an interrupt is detected in decision 162.

In response to an interrupt, the program proceeds through the UART routine 170 to receive data from the telephone connected to the central processor card and to transmit the current status of the lamp field and line connections to the telephone. If data is received from a telephone, as determined by decision 172, this data is decoded in step 174 and the RAM updated accordingly.

Thereafter, in step 176 the processor scans the memory field corresponding to the status of the relays in the switching network 62 and sends a refresh pulse to each relay which should be energized in accordance with the "1" state in the memory.

Following step 176, the loop is completed and returns to the basic loop including steps 164–165 until the next interrupt is detected.

Although only one illustrative embodiment has been described in detail it should be obvious that there are many variations within the scope of the present invention. The invention is more particularly defined in the appended claims.

We claim:

1. In a multi-line key telephone system the combination of:

a key field including a plurality of non-locking push-button keys for selected line connections;

at least two independent audio terminations;

means for coupling said key field to control line selection for a particular audio termination only for a predetermined interval after a new line request therefor; and switching means for coupling said audio terminations to a selected line if selected during said predetermined interval following a new line request.

2. The system according to claim 1 wherein said independent audio terminations are independent handsets.

3. The system according to claim 2 wherein a new line request is initiated either by taking a handset off-hook or by actuating an access key if a handset is off-hook.

* * * * *